(12) United States Patent
Buss et al.

(10) Patent No.: US 6,470,660 B1
(45) Date of Patent: Oct. 29, 2002

(54) MOWER DECK REAR DRAFT QUICK HITCH

(75) Inventors: Steven Henry Buss, Horicon, WI (US); Todd Lynn Smith, Beaver Dam, WI (US); Scott Michael Braemer, Mayville, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/918,588

(22) Filed: Jul. 31, 2001

(51) Int. Cl.[7] ............................................. A01D 34/03
(52) U.S. Cl. ..................................... 56/15.9; 56/17.1
(58) Field of Search ............................. 56/15.1, 15.2, 56/15.8, 15.6, 15.7, 17.1, 17.2, 15.9, DIG. 14, DIG. 22; 180/19.1, 19.3; 280/455.1

(56) References Cited

U.S. PATENT DOCUMENTS

| | | | |
|---|---|---|---|
| 3,948,025 A | 4/1976 | Erdman | |
| 5,025,617 A | 6/1991 | Kuhn et al. | |
| 5,528,886 A | * 6/1996 | Esau | 280/455.1 |
| 5,956,932 A | * 9/1999 | Schmidt | 56/15.6 |
| 5,970,690 A | * 10/1999 | Toman | 56/15.2 |
| 6,293,077 B1 | 9/2001 | Plas et al. | |

* cited by examiner

*Primary Examiner*—Robert E. Pezzuto (57) ABSTRACT

A quick hitch arrangement for attaching the rear portion of an implement, such as a mower deck, to the frame of a lawn and garden tractor includes a lifting arm having a first end pivotally connected to the frame and a forked second end. The forked second end has a pair of vertically spaced upper and lower fingers defining a longitudinal slot therebetween that slidably receives a substantially horizontal pin attached to the rear draft tower of the implement. The arrangement provides a method of hitching the implement to the tractor in which the user does not have to lift the implement manually or with the use of equipment other than the tractor itself.

18 Claims, 6 Drawing Sheets

Fig. 3B

MOWER DECK REAR DRAFT QUICK HITCH

BACKGROUND OF INVENTION

1) Field of Invention

The present invention relates to mounting implements on tractors. More particularly, this invention relates to mounting implements, such as mowers, on lawn and garden tractors. The invention is a quick hitch arrangement for raisably suspending the rear of a mower deck from the tractor frame.

2) Related Art

An implement draft frame for a lawn and garden tractor is disclosed by Erdman in U.S. Pat. No. 3,948,025. The draft frame includes a pair of rear draft arms pivotally connected to the tractor frame and a pair of rear draft brackets on the mower deck respectively. Laterally spaced mounting brackets rigidly attached to on the front of the tractor frame for attaching the implement. The front mounting brackets include a pair of forwardly opening receptacles. A rather complex bracket system is pinned to a pair of front draft towers on the front of the implement by spring loaded J-pins. The bracket structure attached to the front of the implement includes a pair of laterally spaced sins that can be rotated with a lever into the receptacles on the frame brackets. This mower deck mounting system is rather complex and requires a considerable number of moving parts.

A mower deck mounting system is disclosed by Kuhn et al. in U.S. Pat. No. 5,025,617. The system involves a parallel linkage lift mechanism that includes front and rear supports on the mower deck. A pair of laterally spaced rear support brackets on the mower deck includes spring-loaded J-pins, which have truncated legs. The truncated legs of the J-pins are connectable respectively with holes in corresponding laterally spaced lift arms, which are connected with the parallel linkage and the tractor frame. However, this system also requires fabrication and assembly of a considerable number of parts. The spring-loaded J-pin requires a spring, the pin, and a spring retaining means. Because the truncated leg of the J-pin fits into a relatively small hole in a fixed location on the lifting arm, the system requires a lost motion connector to accommodate movement of the mower deck over rough or uneven terrain. Although the system improved the state of the art, there are still challenges when attaching and removing the mower deck. The lifting arms and the brackets on the mower deck must be aligned rather precisely both laterally and vertically. The holes in the lifting arms must be at the proper height to receive the truncated portion of the J-pins. It is hard to make such fine adjustments by steering the tractor and raising or lowering the parallel linkage system. Consequently, a worker must physically lift, move and hold the mower deck while adjusting the height of the lift arms to the desired position. Due to the weight of the mower deck, this can be difficult for a single worker to accomplish without assistance from other workers or equipment.

BRIEF SUMMARY OF THE INVENTION

It is therefore an object of the present invention to provide an improved system for mounting an implement such as a mower deck on a tractor.

It is a further object to provide a mower deck rear draft quick hitch arrangement that is less complex and yet more effective than existing arrangements.

It is another object to provide a mower deck rear draft quick hitch arrangement that reduces or eliminates the need for a separate lost motion connector.

It is another object to provide a mower deck rear draft quick hitch arrangement that uses the lifting and motive power of the tractor to hitch the rear of the mower deck to the frame.

It is a further object to provide a mower deck rear draft quick hitch arrangement that reduces reliance on moving parts such as spring-loaded pins.

It is a further object to provide a mower deck rear draft quick hitch arrangement that forgives some initial misalignment between the lifting arms and the rear draft tower brackets.

Another object of this invention is the provision of a quick hitch arrangement that is economical to produce, easy to use, durable, and reliable.

The mower deck mounting system of this invention includes at least one elongated rear draft lifting arm. Preferably two such lifting arms are included. The lifting arms have a first end that pivotally connects to the frame of the tractor, an intermediate portion that pivotally connects to the parallel linkage means, and a second forked end. The forked end has a pair of vertically spaced upper and lower tines or fingers thereon forming a closed-ended slot or space therebetween for slidably receiving a substantially horizontal pin stationarily mounted on the rear draft tower of the implement.

Also disclosed herein is a structure for supporting the mounting pin on the implement and guiding the lifting arms toward the pin. This structure includes a pair of laterally spaced upright guide members mounted on the implement for supporting the pin therebetween. Each guide member has a straight rear portion and a front portion that is angled away from the rear portion and away from the other guide member so as to correct for any minor lateral misalignment as the lifting arms approach the mounting pins. Similarly, the top portion of each guide member angles away from the other guide member for the same reason.

DESCRIPTION OF THE PREFERRED EMBODIMENT

Figure 1:
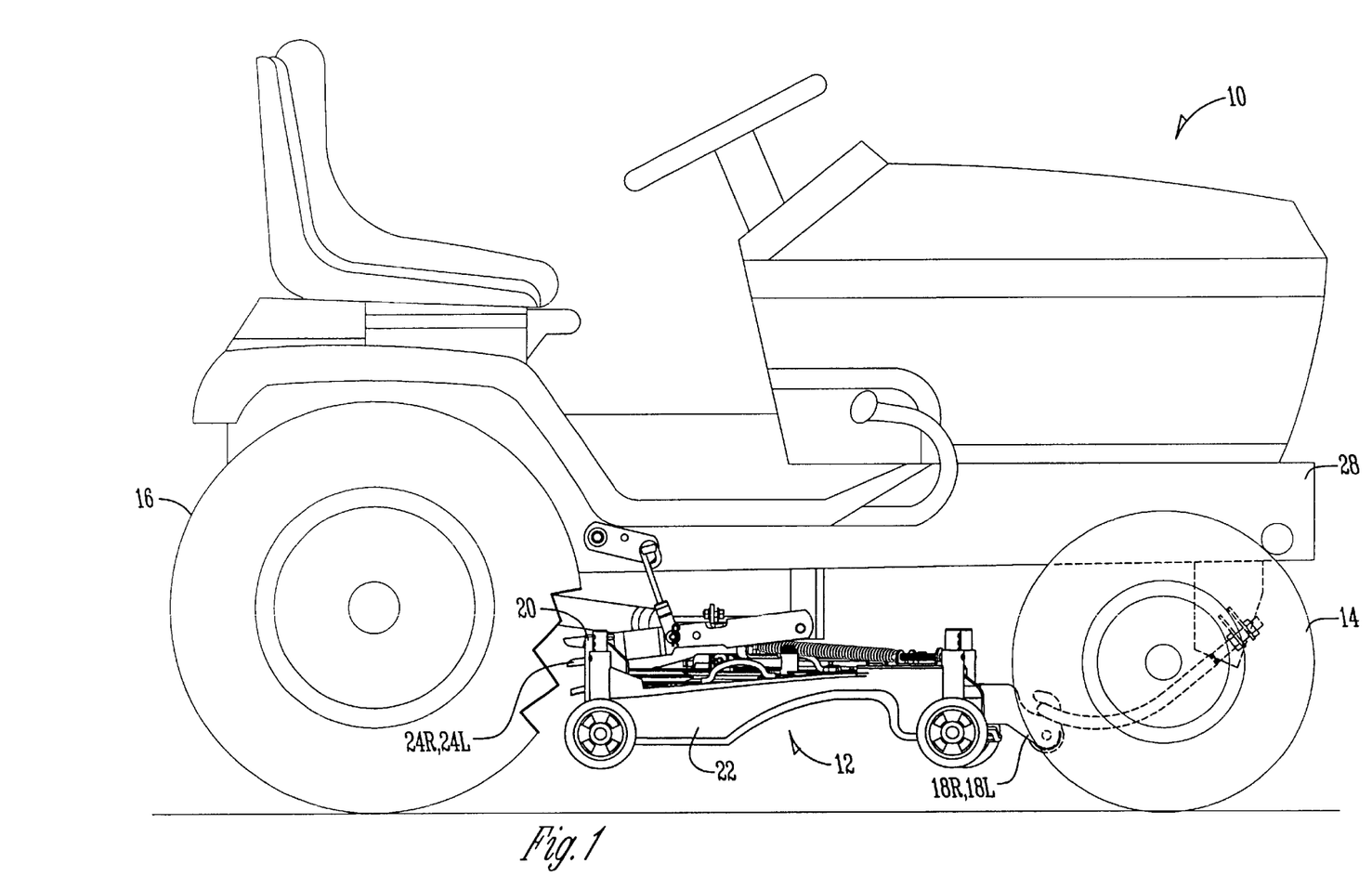
FIG. 1 is a side elevation view of a lawn and garden tractor equipped with the mower deck mounting system of the present invention, which includes a fork-shaped rear draft lifting arm.

Referring to FIG. 1, a lawn and garden tractor or similar vehicle 10 has an implement, such as a rotary mower 12, height-adjustably suspended therefrom. The tractor 10 further includes front wheels 14 and rear wheels 16 sufficiently spaced to accommodate the mower 12. The mower 12 has a housing or deck 22 movably suspended from the tractor framework by a conventional four bar parallelogram linkage system (not shown in detail) at front and rear draft tower brackets 18, 20. The suspension mechanism is designed for equally lifting the front and rear of the mower housing 22, making its height adjustable with respect to the frame 28 of the tractor 10. Preferably the brackets 18 and 20 each include a pair of laterally spaced left and right brackets 18L, 18R; and 20L, 20R.

The front of the mower deck 22 is preferably connected to the frame 28 in the manner disclosed by Kuhn in U.S. Pat. No. 5,025,617. The complete disclosure of U.S. Pat. No. 5,025,617 is incorporated by reference herein. However, the main focus of the present invention is a quick hitch means for connecting the rear of the mower deck 22 to the tractor frame 28.

Figure 2:
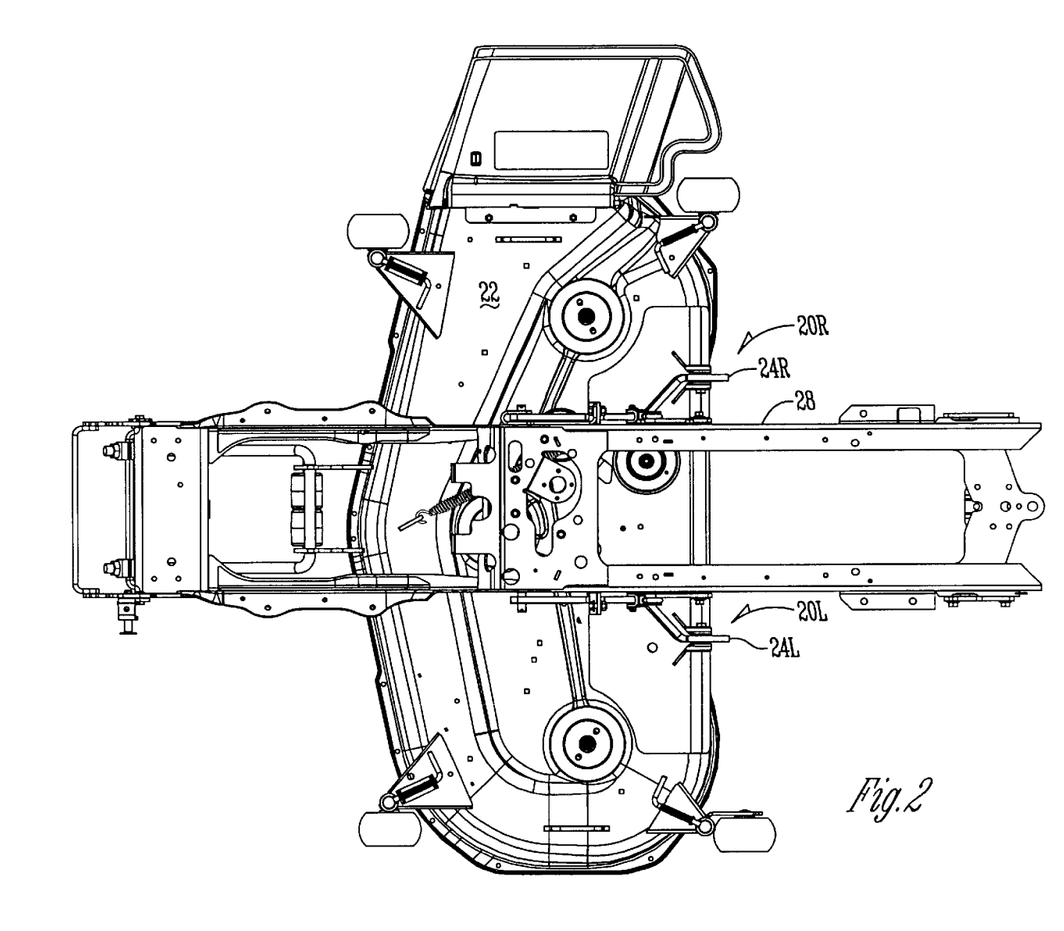
FIG. 2 is a top plan view of frame and mower deck of the tractor in FIG. 1 and shows the fork-shaped rear draft lifting arms and brackets of this invention.
Figure 3:
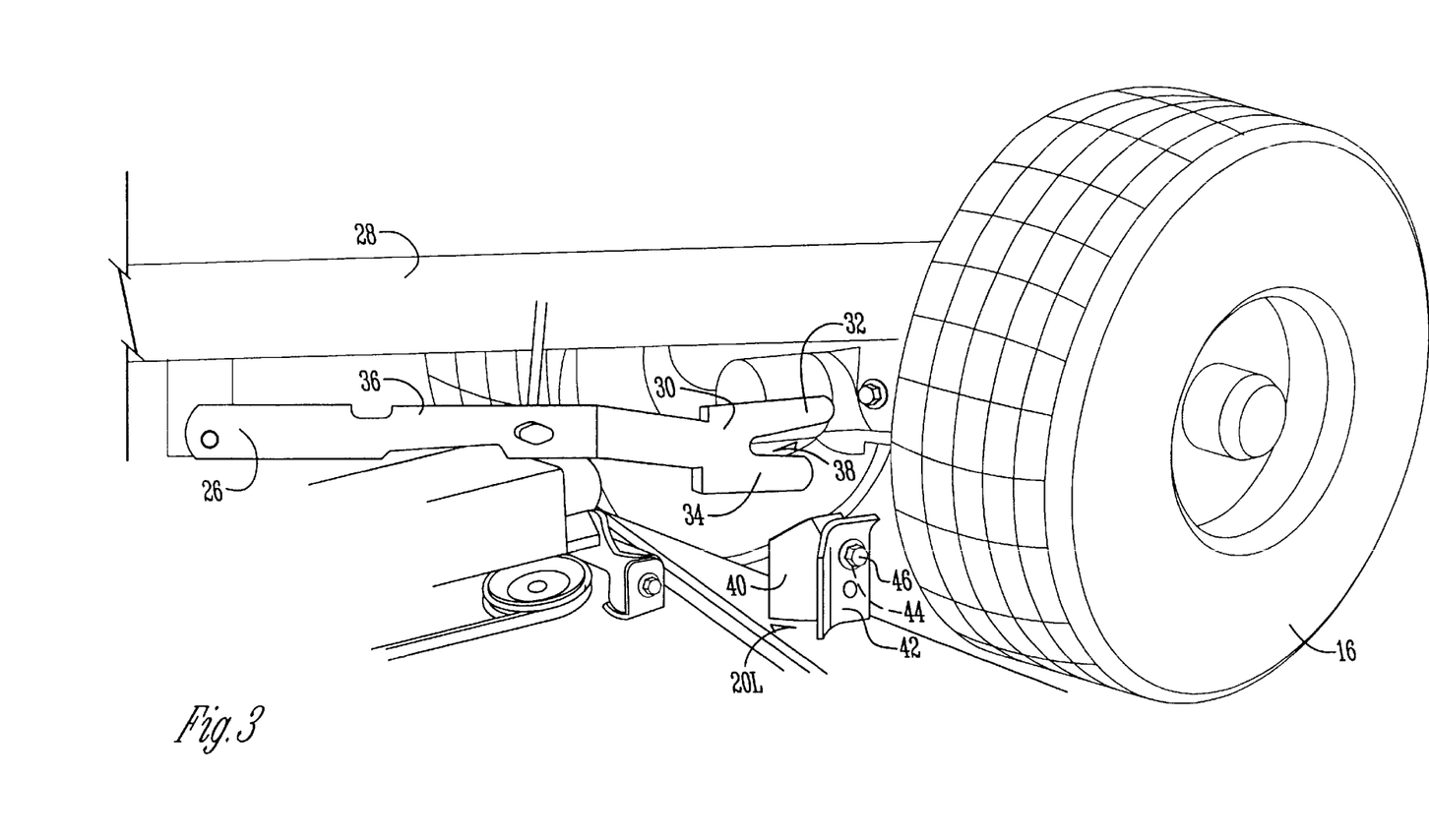
FIG. 3 is a partial perspective view of the tractor of FIG. 1 positioned over a mower deck resting on the ground. One of the fork-shaped lifting arms is shown in a raised position slightly in front of and above its corresponding rear draft tower bracket.

FIGS. 2 and 3 show a quick hitch arrangement for connecting one or more of the rear draft tower brackets 20 to the parallel linkage means and frame 28 of the tractor 10. The arrangement includes at least one rear draft lifting arm, and more preferably two rigid elongated rear draft lifting arms 24L, 24R. A first end 26 of the lifting arm 24L or 24R pivotally connects to the frame 28 of the tractor 10. An intermediate portion 36 of the lifting arm 24L or 24R is pivotally connected to the parallel linkage means. The lifting arm 24L, 24R has a forked second end 30 thereon. The forked second end 30 has a pair of vertically spaced upper and lower tines or fingers 32, 34 extending longitudinally thereon. The upper tine or finger 32 is preferably substantially longer than or extends longitudinally beyond the lower tine or finger 34. The upper and lower tines or fingers 32, 34 define an elongated, substantially longitudinal, closed-ended slot or space, 38 therebetween.

The upper tine or finger 32 and the lower tine or finger 34 are also aligned so that they substantially reside in the same plane, which is generally vertical when the arm is mounted. The upper finger 32 tapers toward a bluntly pointed distal end in a vertical plane so that the closed-ended slot 38 has an open end that is wider than the rest of the slot.

The lifting arms 24L, 24R are each preferably formed from a piece of substantially flat steel bar. The lifting arms 24L, 24R may include bends along their lengths in order to mount to convenient locations on the frame 28 and laterally align with the respective rear draft tower brackets 20L, 20R on the mower deck housing 22. The lifting arms 24L and 24R are preferably constructed as mirror images of each other.

The rear draft tower brackets 20L, 20R each include a pair of laterally spaced upstanding inboard and outboard guide members 40, 42 rigidly attached to the housing 22. Each of the guide members 40, 42 includes a substantially straight rear portion and an angled front portion. Each guide member 40, 42 also includes an outwardly flared or angled top portion and a hole 44 for attaching a substantially horizontal mounting pin 46. The mounting pin 46 is preferably a bolt that is placed through hole 44. Alternatively, the hole 44 can be threaded to eliminate the need for the nut.

Of course, one skilled in the art will appreciate that a single rear draft lifting arm and rear draft tower bracket arrangement could be used to height-adjustably secure the mower 12 to the frame 28 of the tractor 10 if it is centrally located and of sufficient strength.

Figure 3A:
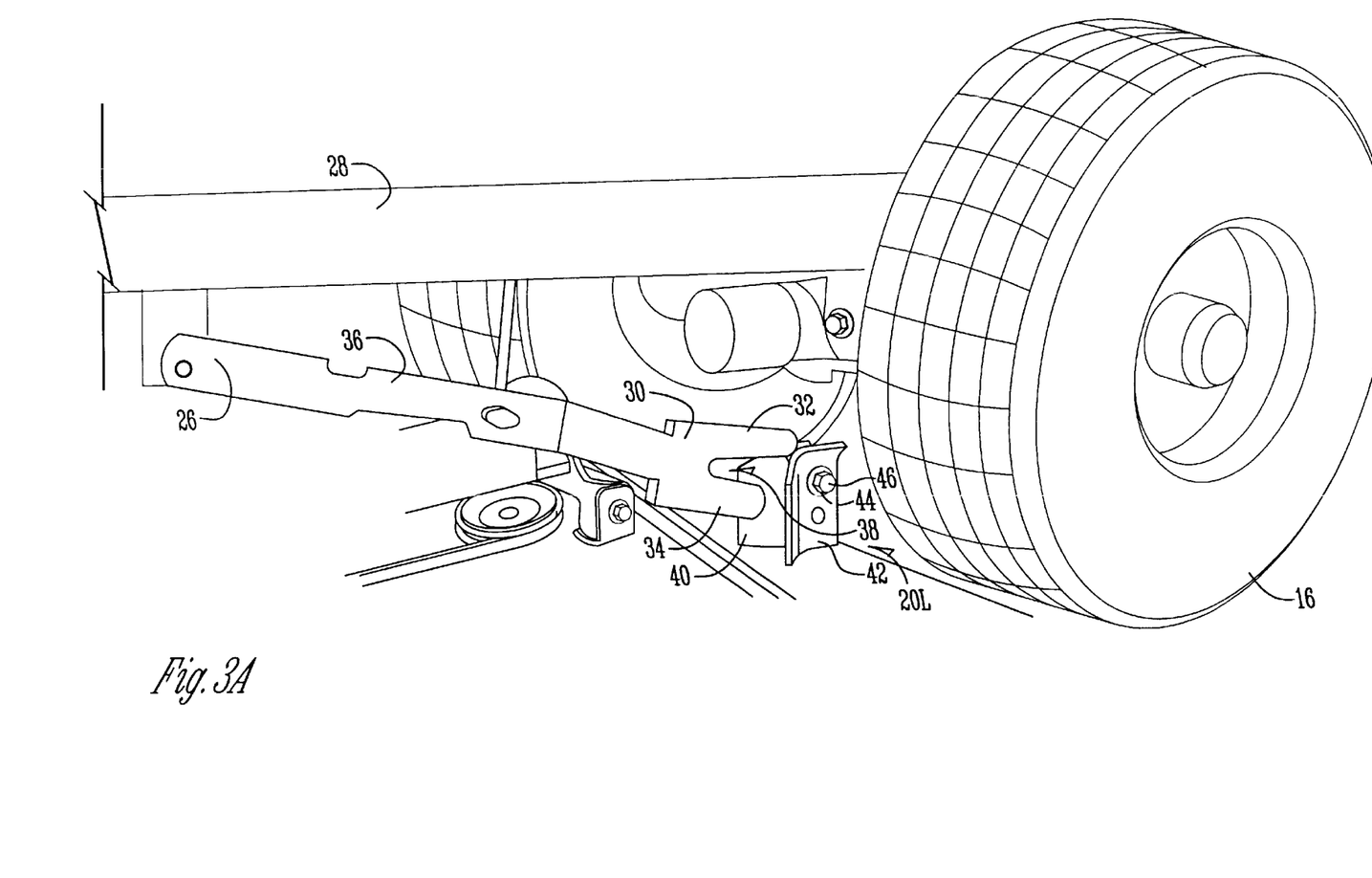
FIG. 3A is similar to FIG. 3 but shows the fork-shaped arm lowered into a ready-to-connect position.
Figure 3B:
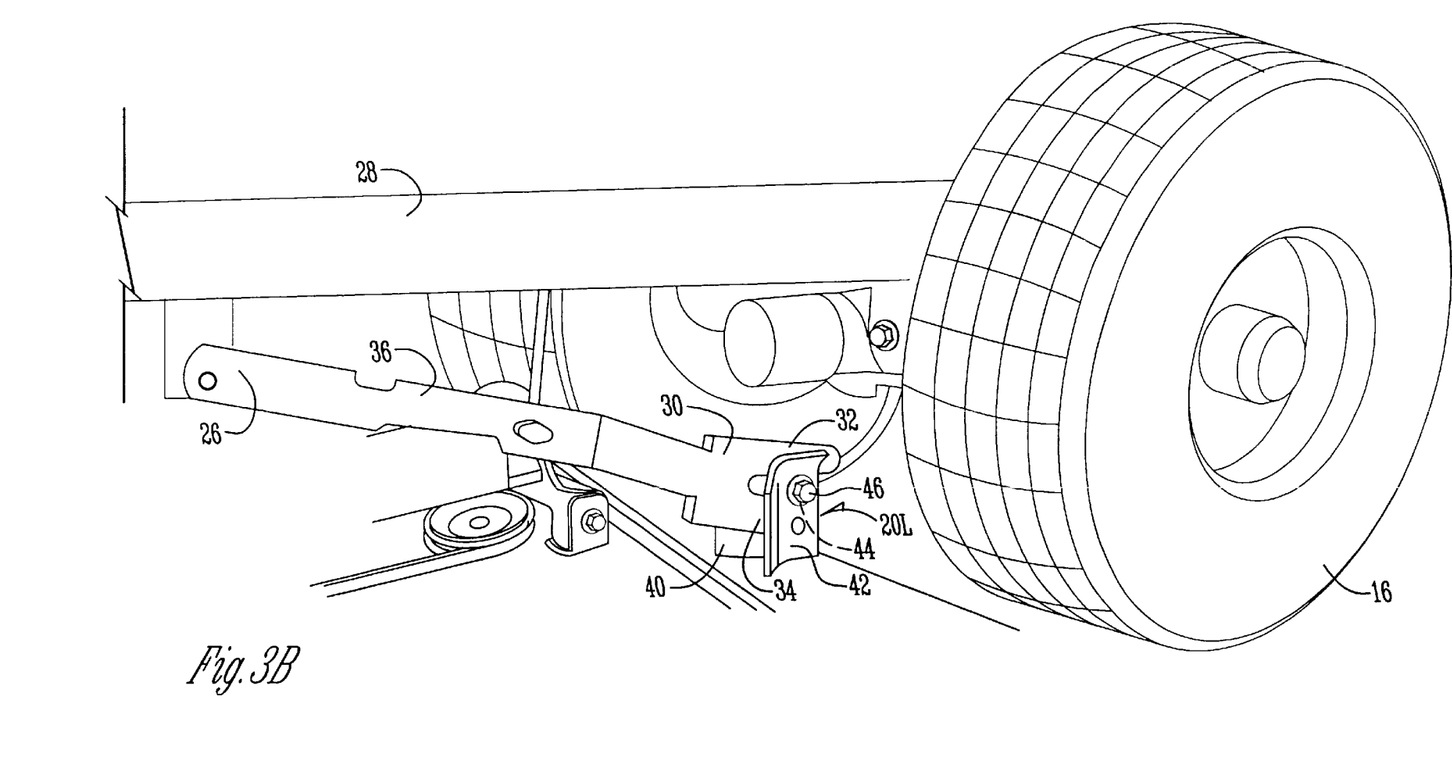
FIG. 3B is similar to FIG. 3 but shows the tractor moved rearwardly so that the fork-shaped arm is in initial engagement with the pin on the rear draft tower bracket.
Figure 3C:
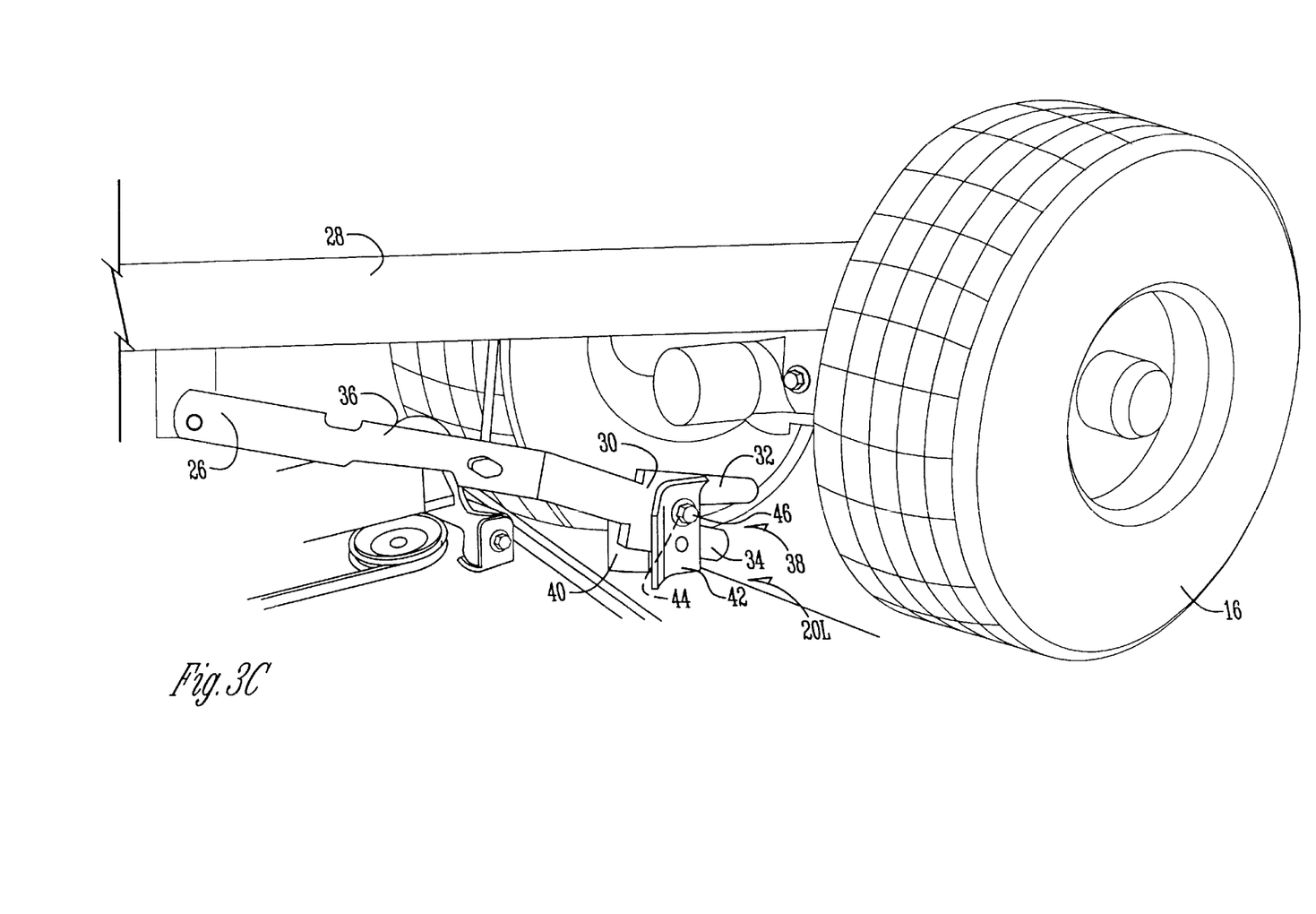
FIG. 3C is similar to FIG. 3B but shows the tractor moved even farther rearwardly so that the fork-shaped arm fully engages the pin on the rear draft tower and provides vertical support for raising and lowering the mower.

The quick hitch arrangement of this invention provides a simple and effective method of hitching an implement such as a mower 12, to the frame 28 of a lawn and garden tractor 10. Advantageously, the method eliminates the requirement of hoisting the mower deck into place, manually or with the aid of equipment other than the tractor itself, and holding it while installing mounting pins. The method includes the steps of placing the implement or mower 12 on the ground; raising the parallel linkage means and thereby raising the lifting arms 24L, 24R; moving the tractor 10 forward across the ground and steering it over the implement 12 so that the forked ends 30 of the lifting arms 24L, 24R are disposed forward of and laterally aligned with the mounting pins 46 and the spaces between the guide members 40, 42 of the rear draft tower brackets 20L, 20R respectively (FIG. 3); lowering the parallel linkage means so as to lower the second forked ends 30 of the lifting arms 24L, 24R until the space 38 between the tines or fingers 32, 34 is at a height generally registered with the height of the mounting pins 46 (FIG. 3A); and moving the tractor 10 rearwardly across the ground until the second forked ends 30 of the lifting arms 24L, 24R are in supporting engagement with the mounting pins 46 (FIGS. 3B and 3C). The user also connects the front of the mower deck to the frame with the conventional front hitching mechanism described in U.S. Pat. No. 5,023,617 to complete the attachment of the implement.

Use of the rear quick hitching mechanism of this invention in combination with the front hitching mechanism of the '617 patent provides a distinct synergistic advantage of its own. Originally, the front hitching mechanism of the '617 patent mainly functioned to keep the mower deck 22 level, while primary attachment and loading occurred at the removable spring-loaded pins on the rear draft towers. With the rear quick hitching arrangement of this invention; however, the front hitching mechanism keeps the mower deck 22 attached to the tractor by pulling the deck forward at the brackets 18L, 18R so as to maintain the mounting pins 46 in secure engagement with the lift arms 20L and 20R.

The angled front portions of the guide members 40, 42 tend to automatically correct for any lateral misalignment by deflecting the upper finger 32 toward the mounting pin 46. The extra length of the upper tine or finger 32 is useful in automatically correcting for any height misalignment because it tends to strike the mounting pin 46 first and urges the lifting arm 24L or 24R upwardly so that the mounting pin 46 is eventually disposed well forward in the slot or space 38 and supported vertically by the lower tine or finger 34 (FIG. 3C). The length of the lifting arms 24L, 24R can be designed so that the upper finger 32 contacts the mounting pin 46 when the lifting arms 24L, 24R are first lowered. In this case, the upper finger 32 prevents the lifting arms 24L, 24R from being lowered too far to properly engage the pin 46. The angled top portions of the guide members 40, 42 also assist in automatically correcting for any minor lateral misalignment as the lifting arms 24L, 24R move into engagement with the mounting pin 46. The top front corners of the guide members 40, 42 are removed or smoothly blended with the top and front portions so that there are no sharp edges or corners for the lifting arms to hit as they approach the mounting pins 46.

In operation, the mounting pins 46 can slide to a predetermined extent in the longitudinal slot 38 and still be vertically supported by the lower finger 34. This feature reduces or eliminates the need for a separate lost motion connector. To unhitch the mower deck, the user merely uses the parallel linkage to lower the mower deck housing 22 onto the ground, disconnects the front hitching means, then drives the tractor 10 forward until the rear draft lifting arms 24L, 24R are free of the pins 46.

Thus, it can be seen that the present invention at least achieves its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the spirit or scope of the invention as defined in the following claims.

What is claimed is:

1. A quick hitch arrangement for attaching an implement to a frame of a lawn and garden tractor comprising:

a first mounting pin extending horizontally on the implement;

a first rigid elongated rear draft lifting arm having opposite ends, a first end adapted to pivotally connect to the frame of the tractor, and a forked second end;

the forked second end having a pair of elongated vertically spaced upper and lower fingers defining therebetween a substantially longitudinal closed-ended slot or space adapted to slidably receive the mounting pin such that the lower finger vertically supports the pin for raising and lowering the implement with respect to the frame.

2. The quick hitch arrangement of claim 1 comprising an identical second mounting pin and a second lifting arm that is constructed as a mirror image of the first lifting arm, the second mounting pin and the second lifting arm being laterally spaced a common predetermined distance from the first mounting pin and the first lifting arm.

3. The quick hitch arrangement of claim 1 wherein the upper finger extends longitudinally beyond the lower finger.

4. The quick hitch arrangement of claim 1 comprising a pair of horizontally spaced upright guide members rigidly attached to the implement and supporting the mounting pin therebetween so as to define together with the pin a rear draft tower bracket.

5. The quick hitch arrangement of claim 4 wherein each guide member has a hole therethrough for receiving a bolt defining the mounting pin.

6. The quick hitch arrangement of claim 5 wherein the mounting pin is stationarily secured to the implement.

7. The quick hitch arrangement of claim 6 wherein the holes through the guide members are threaded holes and the bolt has threads thereon for mating with the threaded holes.

8. The quick hitch arrangement of claim 4 wherein each guide member has substantially straight rear portion and a front portion that is angled away from the straight rear portion and from the other upright guide member.

9. The quick hitch arrangement of claim 4 wherein each guide member has a substantially straight bottom portion and a top portion that is angled away from the straight bottom portion and from the other upright guide member.

10. The quick hitch arrangement of claim 1 wherein the upper finger tapers toward a blunt pointed distal end in a vertical plane such that the closed-ended slot has an open end that is wider than the closed end.

11. In combination, a lawn and garden tractor including a frame, a raisable implement suspended from the frame by parallel linkage means, a quick hitch rear draft arrangement comprising:

a pair of laterally spaced rear draft tower brackets attached to the implement, each including a substantially horizontal mounting pin secured in a fixed location thereon;

a pair of laterally spaced elongated rear draft lifting arms each having a first end pivotally connected to the frame, an intermediate portion pivotally connected to the parallel linkage means, and a forked second end with a pair of vertically spaced elongated fingers thereon defining a substantially longitudinal closed-ended slot therebetween for slidably receiving one of the mounting pins;

whereby the lower finger supports the implement once the lifting arms are positioned on the mounting pins and the mounting pins are disposed in the slots.

12. The combination of claim 11 wherein the brackets each include a pair of horizontally spaced upright guide members rigidly attached to the implement for supporting one of the mounting pins therebetween.

13. The combination of claim 11 wherein each guide member has a straight rear portion and a front portion angled away from the straight rear portion and away from the other guide member of the pair of guide members.

14. The combination of claim 11 wherein each guide member has a substantially straight bottom portion and a top portion that is angled away from the straight bottom portion and from the other guide member of the pair of guide members.

15. The combination of claim 11 wherein the mounting pin is substantially straight.

16. The combination of claim 11 wherein the mounting pin is secured against nonpivotal movement.

17. A quick hitch arrangement for attaching an implement to a frame of a lawn and garden tractor comprising:

a releasable front hitching mechanism including:

first and second support means carried between the frame and implement, each support means including pin means receivable through an opening of a bracket, the pin means being biased towards engagement with the opening;

hanger means supporting the implement from the frame, said hanger means including first and second spaced apart jaw means carried by the implement and the frame respectively, a U-shaped member having leg portions joined to a transversely extending first cross member, the cross member being adapted to be received in one jaw means, a second elongated cross member connected with the leg portions, spaced from the first cross member and receivable in the other jaw means, cam means coupled with one cross member and operable to shift the leg portions between forward and rearward positions; and latch means operatively coupled to the cam means for securing the leg portions in one of their positions; and a releasable rear hitching mechanism including:

a first mounting pin extending horizontally on the implement;

a first rigid elongated rear draft lifting arm having opposite ends, a first end adapted to pivotally connect to the frame of the tractor, and a forked second end;

the forked second end having a pair of elongated vertically spaced upper and lower fingers defining therebetween a substantially longitudinal closed-ended slot or space adapted to slidably receive the mounting pin such that the lower finger vertically supports the pin for raising and lowering the implement with respect to the frame.

18. A method of hitching an implement to the frame of a lawn and garden tractor comprising:

placing on a ground surface an implement having a pair of substantially horizontal mounting pins laterally spaced apart a given distance;

raising a pair of fork-ended rear draft lifting arms pivotally connected to the frame until the lifting arms are disposed higher than the mounting pins on the implement, the forked ends of lifting arms being laterally spaced apart a distance approximately equal to the given distance, the forked ends having a pair of vertically spaced fingers defining a space or slot therebetween;

positioning the tractor over the implement so that the forked ends of the lifting arms are disposed forward of and in general lateral alignment with the mounting pins;

lowering the lifting arms so that the space between the fingers of the forked ends is at a height generally aligned with the mounting pins;

moving the tractor rearwardly across the ground surface until the forked ends of the lifting arms are in vertical supporting engagement with the pins.

* * * * *